United States Patent [19]

Tsurumi

[11] Patent Number: 5,257,259
[45] Date of Patent: Oct. 26, 1993

[54] RING-TYPE LOCAL AREA NETWORK

[75] Inventor: Kanehisa Tsurumi, Hamamatsu, Japan

[73] Assignee: Yamaha Corporation, Hamamatsu, Japan

[21] Appl. No.: 710,826

[22] Filed: Jun. 5, 1991

[30] Foreign Application Priority Data

| Jun. 6, 1990 | [JP] | Japan | 2-148051 |
| Jun. 6, 1990 | [JP] | Japan | 2-148052 |
| Jun. 6, 1990 | [JP] | Japan | 2-148053 |
| Jun. 6, 1990 | [JP] | Japan | 2-148054 |
| Jun. 6, 1990 | [JP] | Japan | 2-148055 |
| Jun. 6, 1990 | [JP] | Japan | 2-148056 |
| Jun. 6, 1990 | [JP] | Japan | 2-148057 |

[51] Int. Cl.$^5$ ............................................. H04L 12/56
[52] U.S. Cl. .................................... 370/60.1; 370/85.15
[58] Field of Search ............... 370/55.8, 85.15, 92, 370/94.1, 100.1, 60, 60.1

[56] References Cited

U.S. PATENT DOCUMENTS

| 4,450,554 | 5/1984 | Steensma et al. | 370/80 |
| 4,637,014 | 1/1987 | Bell et al. | 370/85.15 |
| 4,939,718 | 7/1990 | Servel et al. | 370/85.15 |

*Primary Examiner*—Benedict V. Safourek
*Attorney, Agent, or Firm*—Spensley Horn Jubas & Lubitz

[57] ABSTRACT

In a ring-type LAN, in the decoder of a communication station, a symbol series is decoded from a signal transmitted through the medium of a transmission path and then a synchronization symbol is detected and a first symbol series is synchronized with the synchronization symbol and outputted. Next, in the plurality of dividers of the communication station, only the specific symbols which are used in the LANs of the different protocols are extracted from the first symbol series and a second symbol series are created and outputted. Then, in the plurality of LAN connectors, the second symbol series are inputted and the processing and replacement of the second symbol series is conducted by means of predetermined protocols and new symbol series are outputted. Next, in the combiner, the plurality of symbol series are combined and a new symbol series is outputted. Next, in the encoder, a synchronization symbol is encoded at regular intervals into the symbol series outputted from the combiner and a new symbol series is created. At this time, in the case in which a plurality of symbol series does not exist, a symbol which indicates the nonexistence of a symbol series is inserted and a new symbol series is created. Then this symbol series is encoded into a transmission signal and outputted. The above operations are conducted in sequence in each of the communication stations.

4 Claims, 8 Drawing Sheets

| | | |
|---|---|---|
| 0 | -+++ | DATA SYMBOL 0 |
| 1 | +-++ | DATA SYMBOL 1 |
| 2 | ++-+ | DATA SYMBOL 2 |
| 3 | +++- | DATA SYMBOL 3 |
| 4 | ++++ | DATA SYMBOL 4 |
| 5 | --++ | DATA SYMBOL 5 |
| 6 | -+-+ | DATA SYMBOL 6 |
| 7 | -++- | DATA SYMBOL 7 |
| 8 | -+++ | DATA SYMBOL 8 |
| 9 | +-++ | DATA SYMBOL 9 |
| A | ++-+ | DATA SYMBOL A |
| B | +--+ | DATA SYMBOL B |
| C | ++-+ | DATA SYMBOL C |
| D | ++-- | DATA SYMBOL D |
| E | +++- | DATA SYMBOL E |
| F | ---+ | DATA SYMBOL F |
| BST | ---- | BURST |
| PRA | +++++ | PREAMBLE |
| FS | -+-+ | FRAME START SYNCHRONIZATION SYMBOL |
| FE | -++- | FRAME END SYNCHRONIZATION SYMBOL |
| NC | --++ | NO-DATA SYMBOL |
| CS | -++- | SAMPLE SYNCHRONIZATION START SYMBOL |
| ER | +--- | DATA ERROR SYMBOL |
| OV | +--- | OVERFLOW SYMBOL |
| | +--+ | (RESERVED) |
| | --+- | (RESERVED) |

FIG. 9

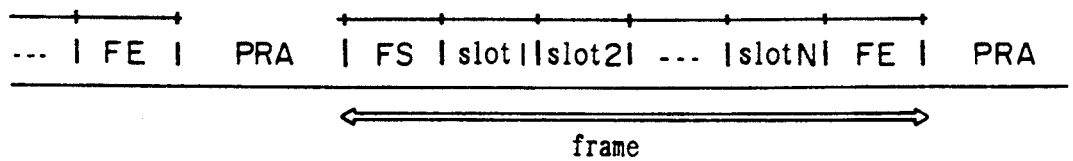
FIG.10
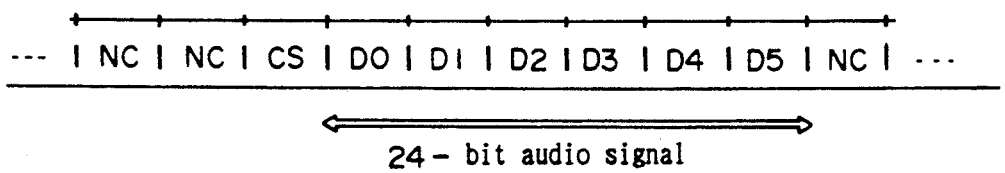
FIG.11
| | | |
|---|---|---|
| BST | —— | BURST |
| PRA | +++ | PREAMBLE |
| P0 | —+ | 0-LEVEL DATA OF THE PACKET SWITCHING TYPE LAN |
| P1 | +— | 1-LEVEL DATA OF THE PACKET SWITCHING TYPE LAN |
| S0 | +— | 0-LEVEL DATA OF THE CIRCUIT SWITCHING TYPE LAN |
| S1 | —— | 1-LEVEL DATA OF THE CIRCUIT SWITCHING TYPE LAN |
| BS | —+ | BIT SERIES START SYNCHRONIZATION SYMBOL |
| ND | —— | NO DATA SYMBOL |
FIG.12
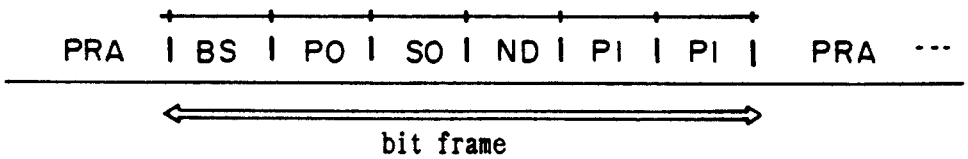
FIG.13

RING-TYPE LOCAL AREA NETWORK

BACKGROUND OF THE INVENTION

1. Field of the Invention

The present invention relates to a ring-type local area network (LAN) which conducts data transmission among a plurality of communication stations which are connected each other in a ring form by means of a transmission path.

2. Prior Art

Conventionally, in cases in which music was performed in a music production studio and a music source thus created, audio data, resulting from the digital conversion of the sound produced by human voices or acoustical musical instruments, and performance control data, such as key-on signals or key-off signals generated by an electronic musical instrument such as a synthesizer or the like, were handled separately.

This was based on the following reasons.

First, performance control data, for example, key-on signals or key-off signals, are preferably transmitted as fixed length signals at the signal generating timing, so that it was possible to use packet switching type LANs, which have been conventionally used in the transmission of computer data. Accordingly, data transmission is sufficiently performed with only one transmission cable.

In contrast, stream data, such as audio data, which are in the form of a continuous time series, must be continually sent as data having a previously set length, for example, 24-bit data, and at a previously set sampling timing. This presents no problem in the case in which the transmission speed is sufficiently high and there are few data. However, there is a problem in the case in which a plurality of circuits overlap. For example, audio data have a comparatively low transmission speed; however, the permissible amount of transmission delay is extremely small, so that it becomes impossible to transmit audio data in real time. Accordingly, it is necessary to provide separate circuits dedicated to each audio data, and conventionally, it was necessary that the number of transmission cables used for audio data be equal to or greater than the number of sources.

Furthermore, software which is used for music production has recently begun to appear which is able to handle not only performance control data, but is also able to directly handle audio data.

Furthermore, in recent years, multimedia has come into increasing prominence. Multimedia technology involves the synchronized handling of mutually associated commands, which permit the processing by present-day computers of numerical values, characters, and graphics, and continuous time series stream data, such as audio data or picture data or the like. In addition, by using this multimedia in a computer, images or sounds can be added in the computer and a "feeling of reality" or "ease of use" can be provided which cannot be obtained by books or television. In addition, it is necessary to be able to simultaneously transmit commands and stream data in the case of this multimedia as well.

As a result of the various conditions stated above, it is desirable to be able to transmit both various types of stream data, which are represented by audio data, and commands which are represented by performance control data, on one LAN in real time without delay.

The transmission speed of commands in a packet switching type LAN was conventionally roughly 4-10 Mbps, however, the transmission speed of stream data, and especially picture data, is necessarily roughly 100 Mbps. Furthermore, the transmission speed of audio data is comparatively low; however, the permissible amount of transmission delay is extremely small. Thus, stream data has various characteristics which differ from those of commands.

Accordingly, the following methods have been suggested for the transmission of commands and stream data having different characteristics on one LAN.

(1) There is a method in which a plurality of protocols are provided by means of multiple frequency division. In other words, one transmission path having a certain frequency band width is divided into a plurality of frequency bands, and channels are allocated thereto and commands or stream data are transmitted on each channel by different protocols. For example, commands are transmitted by means of a certain protocol on the 1-100 Hz frequency band width channel and stream data are transmitted by means of a different protocol on the 101-200 Hz frequency band width channel.

(2) There is a method in which stream data commands are transmitted by means of multiple time sharing. In other words, this is a method in which circuit switching and packet switching are simultaneously conducted on one transmission path according to the type of data.

(3) There is a method in which stream data and commands are handled on the same protocol using ATM (asynchronous transmission mode). In this method, audio data, image data, commands, and the like, are all divided into fixed length blocks, termed cells, and are sent on the transmission path.

However, in the conventional LAN described above, there are the following drawbacks.

In method (1), it is necessary to prepare modems for each frequency, and thus the scale of the circuitry is large.

Furthermore, in method (2), the scale of the circuitry is large and transmission efficiency is also poor.

In addition, in method (3), as the exchangers distribute the cells at high speed by means of hardware, the scale of the circuitry is large.

In the conventional LANs described above, in cases in which difficulties occur, such as the interruption of the transmission path or breakdowns in the communication stations which control transmission, communications are interrupted, so that it is necessary to detect faults more quickly and to conduct repairs directly.

Circuit switching type LANs and packet switching type LANs have fault repair functions, so that the transmission of stream data and commands can be conducted without breakdowns.

However, in the methods (1)~(3) described above, for the transmission of stream data and commands by means of one LAN, it was impossible to transmit stream data and commands on one LAN by means of a simple structure and by means of protocols, without a reduction in transmission efficiency.

Furthermore in cases in which faults occurred, it was impossible to repair such faults directly.

SUMMARY OF THE INVENTION

It is accordingly a first object of the present invention to provide a ring-type LAN which enables the transmission of stream data and commands on one LAN by means of a simple structure and by means of protocols, without a reduction in transmission efficiency, using the two existing technologies of circuit switching type LANs and packet switching type LANs.

Furthermore, it is a second object of the present invention to provide a ring-type LAN which enables the direct repair of faults when such faults occur.

In addition it is a third object of the present invention to provide a circuit switching type LAN which enables the transmission of a plurality of stream data on one transmission path by means of a simple structure and by means of protocols, without a reduction in transmission efficiency.

In the present invention, in a ring-type LAN which conducts data transmission among a plurality of communication stations which are connected in a ring form by means of a transmission path, the plurality of communication stations are provided with a decoding means for decoding a symbol (a symbol represents a predetermined unit of data) series from signals transmitted through the medium of the transmission path, detecting a synchronization signal synchronizing the symbol series from the symbol series, synchronizing the symbol series with the synchronization signal, and outputting the signal series as a first signal series; a plurality of dividing means for inputting the first symbol series thereinto, extracting only specific symbols which are used in a plurality of LANs which process the data by means of the different protocols, creating a second symbol series based on the specific symbols and outputting the second symbol series; a plurality of LAN connecting means, into which the second symbol series are inputted and for processing and replacing the second symbol series by means of previously determined protocols and outputting a new symbol series; a combining means, into which the plurality of symbol series outputted from the plurality of LAN connecting means are inputted and for combining the plurality of symbol series and outputting a combined symbol series; and an encoding means for inserting a synchronization symbol into the symbol series outputted from the combining means at regular intervals, or in the case in which there is no symbol series, for inserting a symbol showing that there are no symbols to thereby create a new symbol series, and for encoding the new symbol series into a transmission signal and outputting encoded symbol series.

By means of the present invention, in the decoding means of a certain communication station, a symbol series is decoded from the signal transmitted through the medium of the transmission path and then the synchronization symbol is detected and the first symbol series is synchronized with the synchronization symbol and outputted.

Next, in the plurality of dividing means, only the specific symbols which are used in the LANs of the different protocols are extracted from the first symbol series and the second symbol series are created and outputted.

Then, in the plurality of LAN connecting means, the second symbol series are inputted and the processing and replacement of the second symbol series is conducted by means of previously determined protocols and new symbol series are outputted.

Next, in the combining means, the plurality of symbol series outputted by the plurality of LAN connecting means are inputted, these are combined and a new symbol series is outputted.

Next, in the encoding means, a synchronization symbol is encoded at regular intervals into the symbol series outputted from the combining means and a new symbol series is created. At this time, in the case in which a plurality of symbol series does not exist, a symbol which indicates the nonexistence of a symbol series is inserted and a new symbol series is created. Then this symbol series is encoded into a transmission signal and outputted.

The above operations are conducted in sequence in each of the communication stations.

In the present invention as described above, in the invention stated, the plurality of LAN connecting means comprises a packet switching type LAN connecting means, which sends packet data to another station through the medium of the transmission path and which receives packet data sent through the medium of transmission path; and a circuit switching type LAN connecting means which encodes stream data and the packet data outputted from the packet switching type LAN connecting means into a symbol series and sends this symbol series to another station through the medium of the transmission path, and receives a symbol series sent through the medium of the transmission path, encodes this symbol series into stream data and packet data, and outputs this packet data to the packet switching type LAN connecting means.

By means of the present invention as described above, the circuit switching type LAN connecting means of each sending station encodes the stream data and packet data outputted by the packet switching type LAN connecting means into a symbol series and transmits this symbol series to another station through the medium of the transmission path.

On the other hand, the circuit switching type LAN connecting means of each receiving station receive the symbol series sent through the medium of the transmission path, encode this symbol series into stream data and packet data, and send these packet data to the packet switching type LAN connecting means.

In the present invention as described above, in the invention stated, in the case in which packet data are not outputted from the packet switching type LAN connecting means, the circuit switching type LAN connecting means sends a no-data symbol indicating the nonexistence of packet data to another station through the medium of the transmission path, and in the case in which a no-data symbol sent through the medium of the transmission path is received, the circuit switching type LAN connecting means outputs nothing to the packet switching type LAN connecting means.

By means of the present invention as described above, in a ring-type LAN, in the case in which packet data are not outputted from the packet switching type LAN connecting means, the circuit switching type LAN connecting means of each sending station sends a no-data symbol to another station through the medium of the transmission path.

In the case in which a no-data symbol sent through the medium of the transmission path is received, the circuit switching type LAN connecting means of each receiving station outputs nothing to the packet switching type LAN connecting means.

In the present invention as described above, in a ring-type LAN which connects data transmission among a plurality of communication stations connected in a ring form by means of a transmission path, among the plurality of communication stations, a fixed sole communication station is provided with a decoding means, which decodes a symbol series from a signal transmitted through the medium of the transmission path, detects a synchronization symbol which is for the purpose of synchronizing the symbol series, synchronizes the symbol series with the synchronization symbol and outputs a first symbol series; a plurality of first dividing means, into which the first symbol series is inputted and which extract only the symbols which are used in a plurality of LANs which process data by means of differing protocols, create second symbol series and output these series; a plurality of LAN connecting means, into which the second symbol series are inputted and which conduct the processing and replacement of the second symbol series by means of protocols which are determined in advance, and output new symbol series; a first combining means, into which a plurality of symbol series outputted by the plurality of LAN connecting means is inputted, and which combines these symbol series and outputs a new symbol series; and an encoding means, which inserts a synchronization symbol at regular intervals into the symbol series outputted from the first combining means, and furthermore, in the case in which there is no symbol series, inserts a no-data symbol indicating the nonexistence of symbols and creates a new symbol series encodes this symbol series, into a transmission signal, and outputs it;

and each downstream communication station is provided with a decoding means; a plurality of second dividing means, which extract only the symbols used in the plurality of LANs which process data by means of differing protocols from the inputted first symbol series and create and output a second symbol series and insert no data symbols in place of the extracted symbols and output a new symbol series; a plurality of LAN connecting means; a second combining means, into which a plurality of symbol series outputted from the plurality of LAN connecting means are inputted, and into which a symbol series which is outputted from the final step second combining means is inputted, and which detects a non-data symbol in this symbol series, replaces the no-data symbol with the plurality of symbol series, and outputs a new symbol series, and in the case in which a plurality of symbol series are not inputted, outputs the symbol series outputted from the final step second combining means as the new symbol series; and an encoding means, which encodes the symbol series outputted by the second combining means into a transmission signal and outputs this signal.

By means of the present invention as described above, first, in the decoding means of a fixed sole communication station a symbol series is decoded from the signal transmitted through the medium of the transmission path a synchronization symbol is detected, and the first symbol series is synchronized with the synchronization symbol and outputted.

Next, in the plurality of first dividing means, only those symbols which are used in the LANs of the various protocols are extracted from the first symbol series, and second symbol series are created and outputted.

Next, in the plurality of LAN connecting means, the second symbol series are inputted, the processing and replacement of the second symbol series are conducted by means of previously determined protocols, and new symbol series are outputted.

Next, in the first combining means, the plurality of symbol series outputted from the plurality of LAN connecting means are inputted, these are combined and a new symbol series is outputted. Then, in the encoding means, a synchronization symbol is inserted at regular intervals into the symbol series outputted from the first combining means and a new symbol series is created. At this time, in the case in which a plurality of symbols does not exist, a no-data symbol is inserted and a new symbol series is outputted. Then, this symbol series is encoded into a transmission signal and outputted.

On the other hand, in the decoding means of each downstream communication station, a symbol series is decoded from the signal sent through the medium of the transmission path, a synchronization symbol is detected, and the first symbol series is synchronized with the synchronization symbol and outputted.

Next, in the initial step second dividing means, only the symbol used in the LAN of a certain protocol is extracted from the first symbol series, a second symbol series is created and outputted, a no-data symbol is inserted in place of the extracted symbol, and a new symbol series is outputted.

Next, in the second step second dividing means, only the symbol used in the LAN of a separate protocol is extracted from the second symbol series outputted by the initial step second dividing means, a second symbol series is created and outputted, and a no-data symbol is inserted in place of the extracted symbol, and a new symbol series is outputted.

The above operation is conducted in each second dividing means.

On the other hand, in the LAN connecting means, which is connected to the output step of each second dividing means, the processing and replacement of the symbol series which is inputted are conducted by means of previously determined protocols, and new symbol series are outputted.

Next, in the second combining means, the plurality of symbol series outputted from the plurality of LAN connecting means are inputted and the symbol series outputted from the final step second dividing means is inputted, and in the case in which a no-data symbol is detected in this symbol series, this no-data symbol is replaced with the plurality of symbol series, and a new symbol series is outputted. Furthermore, in the case in which a plurality of symbol series is not inputted, the symbol series outputted from the final step second dividing means is outputted as the new symbol series.

In addition, in the encoding means, the symbol series outputted from the second combining means is encoded into a transmission signal and outputted.

By means of the present invention as described above, it is possible to transmit stream data and commands on one LAN by means of a simple structure, and by means of simple protocols, without a reduction in transmission efficiency.

In the present invention as described above, in a ring-type LAN which conducts data transmission among a plurality of communication stations which are connected in a ring form by means of a transmission path, the plurality of communication stations are provided with a packet switching type LAN connecting means, which have a fault-repair function, send packet data to another station through the medium of the transmission path, and receive packet data sent through the medium of the transmission path; a circuit switching type LAN connecting means, which send stream data to other stations through the medium of the transmission path and receive stream data sent through the medium of the transmission path; and in the case in which a fault occurs in the plurality of communication stations or in the transmission path, fault repairs are conducted by means of the fault-repair function of the packet switching type LAN connecting means.

By means of the present invention as described above, in a certain communication station, packet data are sent to another station by a packet switching type LAN connecting means through the medium of the transmission path, and stream data are sent to another station by a circuit switching type LAN connecting means through the medium of the transmission path.

On the other hand, in other communication stations, packet data sent through the medium of the transmission path are received in a packet switching type LAN connecting means, and stream data sent through the medium of the transmission path are received in a circuit switching type LAN connecting means.

By means of this, it is possible to transmit packet data and stream data using one LAN.

In addition, in the case in which a fault occurs in a communication station or in the transmission path, fault repairs are conducted by means of the fault-repair function of a packet switching type LAN connecting means.

By means of the present invention as described above, it is possible to transmit stream data and commands on one LAN by means of a simple structure and by means of protocols without a reduction in transmission efficiency, and it is possible to use circuit switching type LAN connecting means which do not have fault-repair functions.

In the invention stated in claim 6, in a ring-type local area network (LAN) having predetermined numbers of channels for conducting the transmission of stream data among a plurality of communication stations which are connected in a ring form by means of a transmission path, by using transmitting frames having a plurality of slots corresponding to the channels, comprising: sending stations for encoding the stream data and the synchronization data synchronizing the stream data into symbols by an identical encoding method, dividing and inserting the symbols into previously established, predetermined slots in the frames, and for sending the symbols at regular intervals through the medium of the transmission path; receiving stations for connecting the symbols with identically numbered slots of the plurality of frames transmitted through the medium of the transmission path, obtaining stream data, synchronizing these stream data with the synchronization data and outputting the stream data.

By means of the present invention as described above, the sending stations first encode the stream data and synchronization data into symbols by means of an identical encoding method. Then, they divide and insert these symbols into previously established, predetermined slots in the frames, and send the symbols at regular intervals through the medium of the transmission path.

On the other hand, the receiving stations connect the symbols within identically numbered slots within each frame transmitted through the medium of the transmission path and obtain stream data, synchronize these stream data with the synchronization data, and output them.

By means of the present invention as described above, it is possible to transmit a plurality of stream data on one LAN by means of a simple structure and by means of simple protocols without a decrease in transmission efficiency.

In the present invention as described above, in the case in which there are no stream data which are to be sent to a station, the sending station of that station inserts a symbol indicating the nonexistence of stream data in place of the encoded symbol in the corresponding slot of a frame, and sends this.

By means of the present invention as described above, in a ring-type LAN, in the case in which there are no stream data which are to be sent to a station, this sending station inserts a symbol indicating the nonexistence of stream data in place of the encoded symbol in the corresponding slot of the frame and sends this.

In the present invention as described above, in the case in which a transmission abnormality has been detected, the sending station inserts a symbol indicating a transmission abnormality in place of the symbol into which the stream data have been encoded into the corresponding slot of a frame and sends this.

By means of the present invention as described above, in a ring-type LAN, in the case in which a transmission abnormality has been detected, the sending station inserts a symbol indicating a transmission abnormality in place of the symbol into which the stream data have been encoded into the corresponding slot of a frame and sends this. Accordingly, each receiving station is able to recognize that a transmission abnormality has occurred.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings:

FIG. 9 is a diagram showing an example of a data encoding method in accordance with the first concept;

FIG. 10 is a diagram showing an example of the structure of a frame in accordance with the first concept;

FIG. 11 is a diagram showing an example of the structure of audio data in accordance with the first concept;

FIG. 12 is a diagram showing an example of an encoding part 37 in accordance with the second concept.

FIG. 13 is a diagram showing an example of the structure of a bit frame in accordance with the second concept.

DETAILED DESCRIPTION OF THE PREFERRED EMBODIMENTS

Before explaining the preferred embodiments of the present invention, the basic concept for solving the above-stated problems will be explained.

The applicants have previously submitted joint and individual applications concerning packet switching type LANs operating by means of token ring methods which are intended for use in real time.

Here, the structure of a packet switching type LAN connecter will be explained which controls the sending and receiving of signals and is used in the above-described packet switching type LAN.

Figure 5:
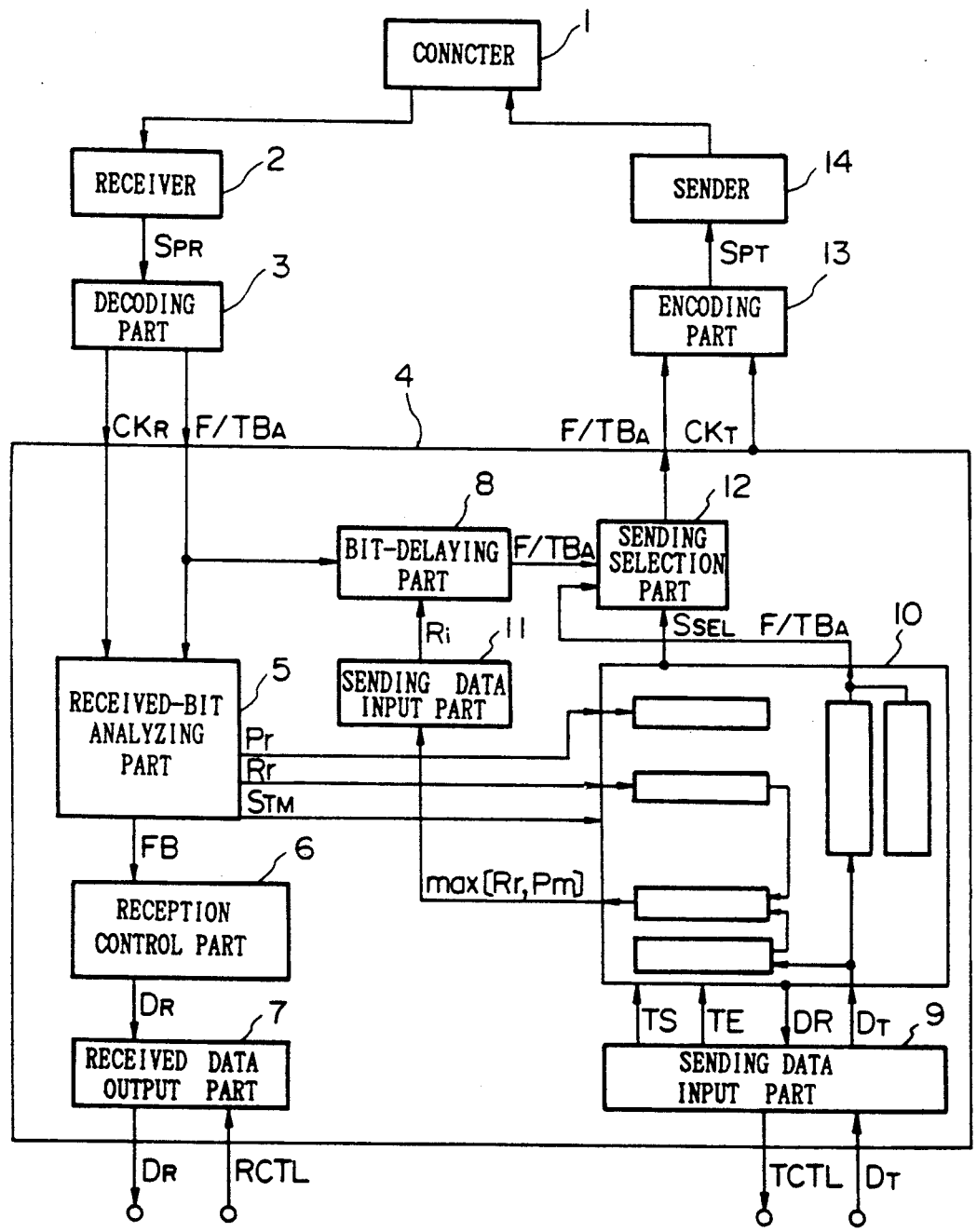
FIG. 5 is a block diagram showing an example of the structure of a conventional packet switching type LAN connecter 4 and its peripheral equipment.

FIG. 5 is a block diagram showing the structure of a packet switching type LAN connecter and its peripheral equipment. Reference numeral 1 indicates a connecter which is connected to a transmission path such as an optical fiber cable or the like, and reference numeral 2 indicates a receiver which inputs a signal which is transmitted through the medium of the transmission path and connecter 1 and outputs a 1-bit width signal $S_{PR}$.

Furthermore, reference numeral 3 indicates a decoding part; it decodes a frame/token bit series $F/TB_A$ from signal $S_{PR}$ and a PLL circuit part in the interior thereof extracts bit clock $CK_R$ from signal $S_{PR}$ and outputs this Furthermore, reference numeral 4 indicates a packet switching type LAN connecter. In the packet switching type LAN connecter 4, reference numeral 5 indicates a received-bit analyzing part; it normally checks the frame/token data series $F/TB_A$ and conducts the detection of the timing signal $S_{TM}$ which relates to the beginning and end of frame/token bit series $F/TB_A$ and the detection and creation of ring priority degree Pr and reservation priority degree Rr and the extraction of the frame bit series $FB_A$ which comprises the frame. Here, the ring priority degree Pr is the present priority degree of the token or frame transmitted on the transmission path, and the reservation priority degree Rr is a priority degree which is used by the communication station to conduct the reservation of data transmission in correspondence with the priority degree of the data within the station.

Reference numeral 6 indicates a reception control part; the frame bit series $FB_A$ is inputted thereinto, and this control part determines whether or not this frame bit series $FB_A$ is addressed to the station, and outputs the received data $D_R$ which are addressed to the station. Reference numeral 7 indicates a received data output part, into which the received data $D_R$ are inputted and which outputs received data $D_R$ based on the reception control signal RCTL which is outputted by a data control part which is not shown in the diagrams.

Reference numeral 8 indicates a bit-delaying part which conducts the rewriting of bits during the relaying of frame/token bit series $F/TB_A$, and reference numeral 9 indicates a sending data input part; it inputs sending control signal TCTL into a data processing part (not shown in the diagram), and thereby, the sending data $D_T$ which are to be sent are outputted from the data processing part and inputted into sending data input part 9, and this input part 9 then outputs sending data $D_T$ based on a data-request signal $D_R$ which is outputted by a sending control part 10 which is described hereinafter.

Reference numeral 10 indicates a sending control part; it creates token bit series $TB_A$, and, based on the sending indication signal TS and sending ending signal TE which are outputted by sending data input part 9, outputs a data request signal $D_R$ to sending data input part 9 and thereby has inputted a sending data $D_T$, creates a frame-bit series $FB_A$ and outputs this according to the token-ring protocol. The creation of this frame-bit series $FB_A$ is conducted based on the data priority degree Pm which is extracted from sending data $D_T$, the ring-priority degree Pr which is outputted by received-bit analyzing part 5, reservation priority degree Rr, and timing signal $S_{TM}$.

Reference numeral 11 indicates a sending reservation part, into which is inputted the greater of the reservation priority degree Rr and the data priority degree Pm which are outputted from sending control part 10, and which sets the reservation index bit Ri of the frame/token bit series $F/TB_A$ passing through bit delaying part 8 to a value corresponding to this priority degree. Reference numeral 12 indicates a sending selection part which selects and outputs either the frame/token bit series $F/TB_A$ outputted from bit delaying part 8 or the frame/token bit series $F/TB_A$ outputted from sending control part 10. This selection is conducted based on the selection signal $S_{SEL}$ which is outputted from sending control part 10.

Furthermore, reference numeral 13 indicates an encoding part which encodes the frame/token bit series $F/TB_A$ which is outputted from sending selection part 12 of packet switching type LAN connecter 4, and reference numeral 14 indicates a sender into which the output signal $S_{PT}$ of encoding part 13 is inputted and which sends this signal $S_{PT}$ to another communication station through the medium of the transmission path.

The details of the above-described packet switching type LAN are given in the specifications and diagrams of Japanese Patent Application First Publication No. Hei 1-342291~Japanese Patent Application First Publication No. 1-342295 and Japanese Patent Application First Publication No. Hei 1-343211.

The packet switching type LAN connecter 4 described above can be constructed of LSIs (Large Scale Integrated Circuits) so that it is possible to transmit commands simply by means of using LSIs in the packet switching type LAN.

Accordingly, in this invention, the transmission of commands is conducted using the above-described packet switching type LAN connecter 4, and the LAN which transmits commands and stream data is a LAN which uses hybrid-type protocols consisting of circuit switching type protocols for stream data and packet switching type protocols for commands.

Next, as for the topology of the LAN, because the above-described packet switching type LAN connecter 4 is used, it has a ring form LAN topology. Furthermore, a base band transmission method is used.

Two hybridization concepts are given below.

Figure 6:
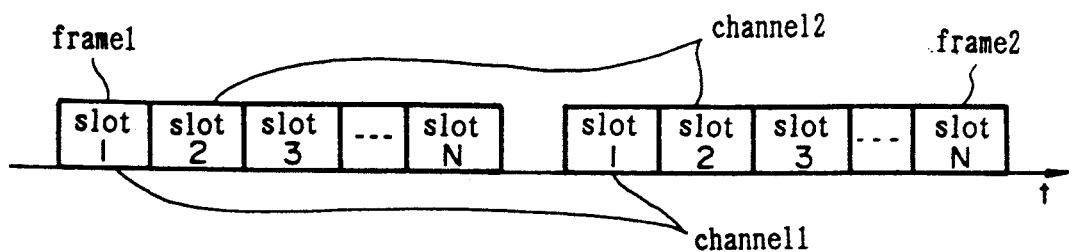
FIG. 6 is a diagram showing an example of the structure of a frame according to the first concept.

According to the first concept, the data of the packet switching type LAN are placed on the circuit switching type LAN channel. First, in the protocol of the circuit switching type LAN, N channels is provided which can support transmissions of a 1-to-many (either 1-to-1) type. Accordingly, it is possible to handle a number N of independent stream data. Furthermore, the stream data are transmitted using a frame which has a number of slots N corresponding to the number of channels N as shown in FIG. 6.

Each sending station allocates and inserts the stream data into previously established slots among the number of slots N of each frame and transmits this frame at regular intervals in a time division multiplex manner at a timing which is sufficient for the transmission of the stream data. On the other hand, each receiving station assembles the stream data of the channel by combining symbols (the symbol represent a predetermined unit of data) which are in identically numbered slots of each frame.

By means of this, it is possible to transmit data in a form in which one channel is created for each stream data. For example, in FIG. 6, by combining the data in slot 1 of frame 1 and the data in slot 1 of frame 2, the stream data of channel 1 are assembled, and by combining the data of slot 2 of frame 1 and the data of slot 2 of frame 2, the stream data of channel 2 are assembled.

Furthermore, the data of the packet switching type LAN are divided and inserted into available slots of each frame.

By means of this, it is possible to transmit commands and stream data by means of one transmission path.

Figure 7:
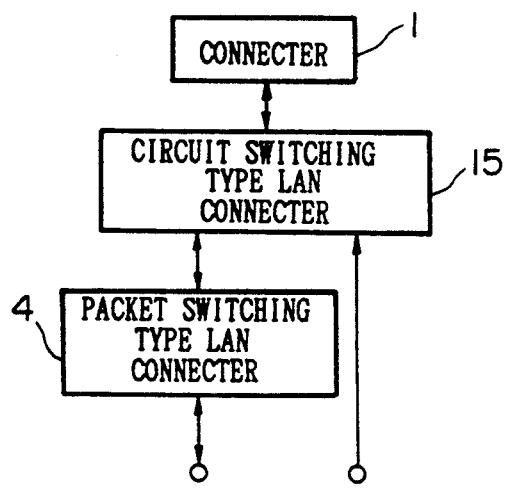
FIG. 7 is a diagram showing an example of the structure of a signal-sending and -receiving control part of a ring-type LAN to which the first concept has been applied.

Here, an example of the structure of the signal sending and receiving control part in accordance with the first concept is shown in FIG. 7. In this diagram, reference numeral 1 indicates a connecter, reference numeral 4 indicates the packet switching type LAN connecter described above, and reference numeral 15 indicates a circuit switching type LAN connecter which controls the sending and receiving of signals and is used in a circuit switching type LAN.

Furthermore, according to the second concept, the data of the circuit switching type LAN and the data of the packet switching type LAN are combined into one data. Here, an example of the varying data encoding methods is given below.
000: 0-level data of the circuit switching type LAN
001: 1-level data of the circuit switching type LAN
010: 0-level data of the packet switching type LAN
011: 1-level data of the packet switching type LAN Accordingly, the data of the circuit switching type LAN and the data of the packet switching type LAN are encoded in this way by an identical encoding method, and thereby the data can be combined and transmitted as a single piece of data and it is possible to separate the various data from the combined data.

Figure 8:
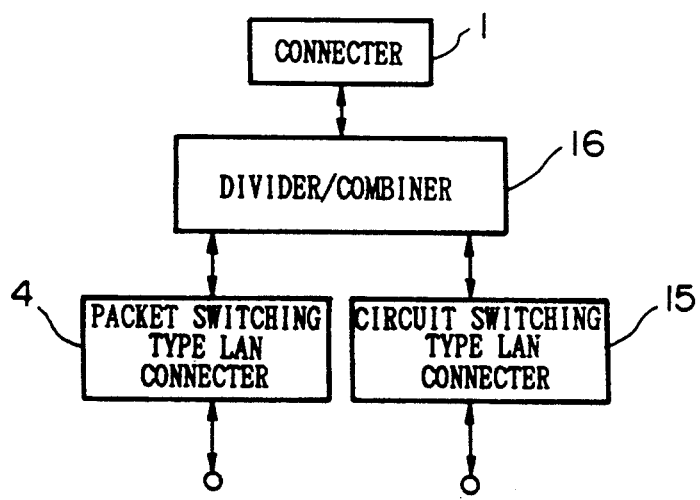
FIG. 8 is a diagram showing an example of the structure of a signal-sending and -receiving control part of a ring-type LAN to which the second concept has been applied.

Here, an example of the structure of the data sending and receiving control part according to the second concept is shown in FIG. 8. In the figure, the parts corresponding to the parts in FIG. 7 are identically numbered and an explanation of these parts is omitted here. In FIG. 8, reference numeral 16 indicates a divider/combiner which divides the signal transmitted through the medium of connecter 1 into a signal for the packet switching type LAN and a signal for the circuit switching type LAN and also combines the signals outputted by the packet switching type LAN connecter 4 and the circuit switching type LAN connecter 15 and outputs this as a combined signal through the medium of connecter 1. The circuit switching type LAN connecter 15 shown in FIG. 8 does not have a different structure from that of the circuit switching type LAN connecter 15 shown in FIG. 7.

By means of adopting the concepts explained above, it is possible to transmit stream data and commands such as musical tone control data and the like on one LAN by means of simple protocols and by means of a simple structure without a reduction in transmission efficiency.

(1) Explanation of the First Concept

In the encoding method of the stream data, encoding methods are combined so that when each bit of the stream data has a value of "0", there is no change, and when all bits have a value of "1", an NRZI (non return to 0 inverted) which inverts the level, and a 4B/5B encoding method which expresses 4-bit data in terms of 5 bits, are implemented. In the preferred embodiment, thirty two symbols are included in 4B/5B method. Further, the thirty two symbols include sixteen data symbols (from zero to fifteen) and sixteen not-data symbols (from sixteen to thirty two). An example of this encoding method is shown in FIG. 9. In the figure, a "+" indicates an inversion of polarity, while a "−" indicates that polarity is not converted.

In FIG. 9, (0)~(F) represent symbols for data and (BST)~(FE) represent synchronization symbols for the frames; they are used to find the frames. An explanation of the structure of the frames is included in the explanation of FIG. 10 hereinafter. Furthermore, (NC)~(OV) represent synchronization symbols for the data of each slot.

In FIG. 9, (RESERVED) does not refer to present use, but rather has the meaning of reservation for future use.

Next, the structure of the frames which are transmitted among the communication stations will be explained using FIG. 10. These frames have a fixed length and begin with a frame start synchronization symbol (FS), continue with a number N of slots (corresponding to a number N of channels) and end with a frame end synchronization symbol (FE). A preamble (PRA) is placed between frames.

Furthermore, the size of one slot corresponds to the size of one symbol; the above described data symbols from (0)~(F), and non-data symbols such as a symbol (NC) which indicates that there are no data in the slot (hereinafter termed the "no-data symbol"), a sample synchronization start symbol (CS), a data error symbol (ER), and a sending buffer overflow symbol (OV), can be placed in the slots. In each receiving station, when the symbols within the identically numbered slots of each frame are combined, for example, in the case of 24-bit audio data, it is necessary to synchronize this data so that the above described non-data symbols (NC)~(OV) are used for the synchronization of the data.

In the above manner, by encoding the symbols which are used for the synchronization of the data together with the data, it is possible to use the data synchronization symbols (NC)~(OV) at the same level in the frames and within the channels, transmission efficiency increases, and since it is not necessary to decode the data and synchronization data from these symbols, the structure of the circuitry can be simplified.

Next, the expression of the audio data which are stream data obtained by combining the symbols within identically numbered slots of the frames will be explained. An example of the format of the audio data is shown in FIG. 11. The division of the samples is shown by means of the above-described sample synchronization start symbol (CS) and the 24-bit PCM (Pulse Code Modulation) values are shown by means of the six data symbols (D0~D5). A no-data symbol (NC) may be inserted at any point in the symbol series; the speed of the slots which are transmitted at regular intervals and the speed of the audio data which is generated nonsystematically are adjusted by means of this symbol (NC).

Furthermore, another type of data which can be obtained by the combining of the symbols within identically numbered slots of the frames is packet switching type LAN data such as musical tone control data. This data is, like the audio data, decoded from symbols within specified slots (described below) of the frames based on the above-described encoding method. As in the case of audio data, a 4-bit signal is expressed by means of 1 data symbol. No-data symbols (NC) may be inserted at any point in the symbol series; the speed of the slots and the speed of the music control data is adjusted by means of these symbols.

The packet switching type LAN data can be used for ring-fault repair as well as for tone control. When the base of the packet switching type LAN moves to a forced-sending state as a result of abnormalities in the ring, the communication stations stop the repeating of the frames and move to a forced-sending state of only those frames which are in channels corresponding to these data. Furthermore, the packet switching type LAN data are also used in maintenance processes, such as the channel allocation in the circuit switching type LAN. The details of the format use and the like of the packet switching type LAN data are given in the specification and diagrams of the above-mentioned Japanese Patent Application First Publication No. Hei 1-342291.

The packet switching type LAN data are, in contrast to the audio data, originally data which were repeated by each communication station of the LAN, so that it is necessary that all communication stations conduct the receiving of these data using identically allocated slots (channels) and thus repeat the data. As a result of this repeat processing, a delay corresponding to at least one frame is created in each communication station; however, by means of allocating a plurality of slots to the packet switching type LAN data, this delay can be so controlled as to be as small as possible.

Figure 1:
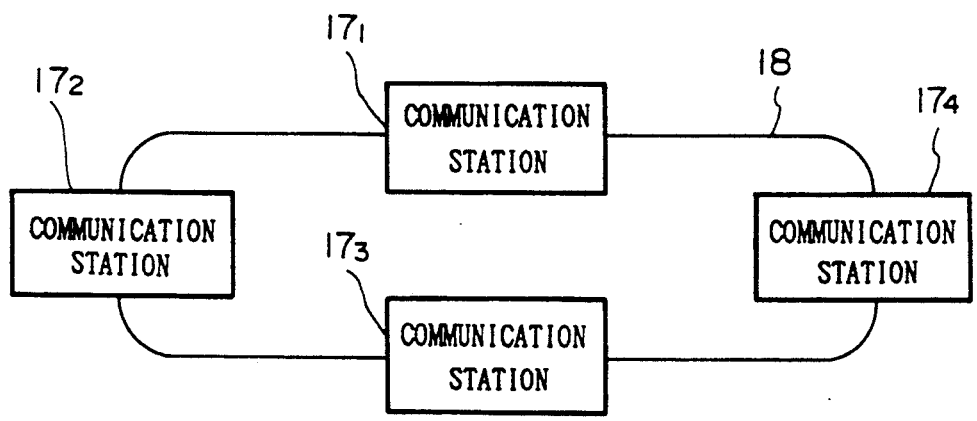
FIG. 1 is a block diagram showing the structure of a ring-type LAN in accordance with a preferred embodiment to which the first and second concepts have been applied.

Hereinbelow, an example to which the first concept has been applied will be explained with reference to the diagrams. FIG. 1 is a block diagram showing the structure of a ring-type LAN in accordance with an example to which the first concept has been applied. In FIG. 1, reference numerals $17_1 \sim 17_4$ indicate communication stations which mutually conduct data transmission; communication station $17_1$ is a master station which sends the frames at regular intervals and conducts recovery, while communication stations $17_2 \sim 17_4$ are slave stations which conduct receiving and sending processing while repeating the frames. Reference numeral 18 indicates a transmission path such as an optical fiber cable or the like which connects communication stations $17_1 \sim 17_4$ in a ring form.

Figure 2:
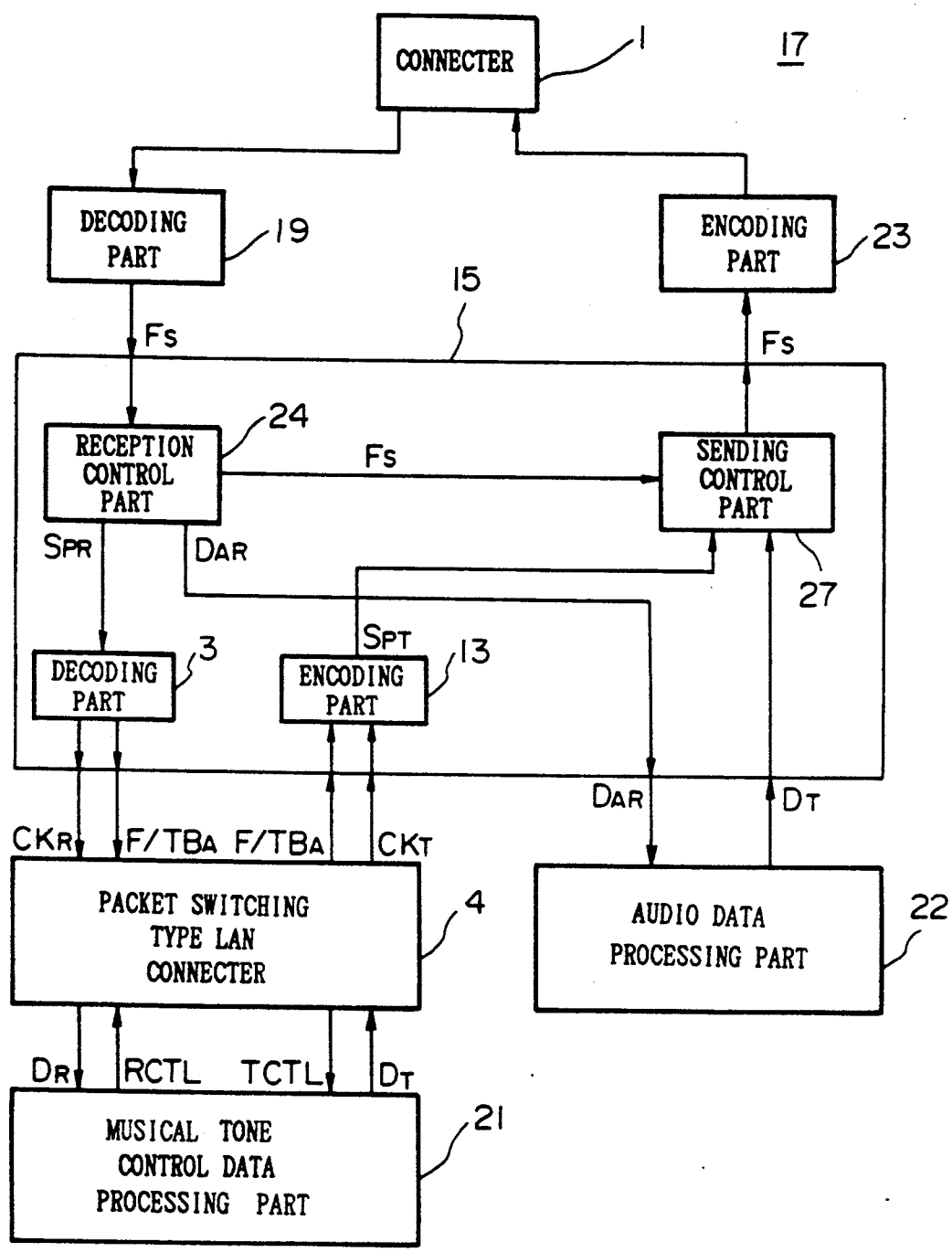
FIG. 2 is a block diagram showing the structure of communication station 17 in accordance with preferred embodiment to which the first concept has been applied.

Here, FIG. 2 is a block diagram showing the structure of a communication station 17 as in FIG. 1. In this diagram, reference numeral 1 indicates a connecter, reference numeral 19 indicates a decoding part which decodes and outputs a frame $F_S$ having a format shown in the above-described FIG. 10 from a signal which is transmitted through the medium of transmission path 18 and connecter 1, reference numeral 15 indicates the above-described circuit switching type LAN connecter, reference numeral 4 indicates the above-described packet switching type LAN connecter, and reference numeral 21 indicates a musical tone control data processing part which conducts the processing of musical tone control data $D_R$ which are outputted by packet switching type LAN connecter 4 and the processing of musical tone control data $D_T$ which are to be sent to another communication station 17.

Furthermore, reference numeral 22 indicates an audio data processing part which conducts the processing of audio data $D_{AR}$ which are outputted by the circuit switching type LAN connecter 15 and the processing of audio data $D_{AT}$ which are to be sent to another communication station 17. Reference numeral 23 indicates an encoding part which encodes the sending frame $F_S$ outputted by circuit switching type LAN connecter 15 into a sending a signal and sends this signal through the medium of connector 1 and transmission path 18. Furthermore, in circuit switching type LAN connecter 15, reference numeral 24 indicates a reception control part which retrieves symbols from the slots of each frame $F_S$ which contain audio data which are allocated to the station and from the slots of the packet switching type LAN, and inserts no-data symbols (NC) in place of these symbols, creates a symbol series for each slot, divides these into a symbol series $S_{PR}$ for use in the packet switching type LAN and audio data $D_{AR}$ (see FIG. 11), and outputs these. Among these, audio data $D_{AR}$ are outputted having a sample start synchronization symbol (CS), as shown in FIG. 11.

Reference numeral 3 indicates a decoding part which decodes an inputted symbol series $S_{PR}$ into a packet switching type LAN frame/token bit series $F/TB_4$, synchronizes this with clock $CK_R$, and outputs this.

Reference numeral 13 indicates an encoding part into which the frame/token bit series $F/TB_4$, which is synchronized with clock $CK_T$ and outputted from packet switching type LAN connecter 4, is inputted, and which encodes this into a symbol series $S_{PT}$ and outputs this series. Reference numeral 27 indicates a sending control part into which audio data $D_{AT}$ and symbol series $S_{PT}$ which is outputted from encoding part 13 are inputted and which inserts these into previously determined slots of each frame $F_S$ outputted by reception control part 24, and outputs these frames $F_S$.

Here, the number of slots corresponding to one frame is 15, and the allocation of each slot is determined in advance as shown below.

(1) Transmission of Audio Data
Slot 1: master station $17_1$ to slave station $17_2$
Slot 2: slave station $17_2$ to slave station $17_3$
Slot 3: slave station $17_3$ to slave station $17_4$
Slot 4: slave station $17_4$ to master station $17_1$
Slot 6: master station $17_1$ to slave station $17_3$
Slot 7: master station $17_1$ to slave station $17_4$
Slot 9: slave station $17_2$ to master station $17_1$
Slot 10: slave station $17_2$ to slave station $17_4$
Slot 11: slave station $17_3$ to master station $17_1$
Slot 13: slave station $17_3$ to slave station $17_2$
Slot 14: slave station $17_4$ to slave station $17_2$
Slot 15: slave station $17_4$ to slave station $17_3$ (2) Transmission of Tone Control Data
Slots 5, 8, 12

The operation of the transmission of audio data and musical tone control data by each communication station $17_1 \sim 17_4$ having this structure will be explained below.

First, in master station $17_1$, musical tone control data $D_T$ such as key-on signals and the like from musical tone control data processing part 21 (see FIG. 1) are outputted based on the output timing of the sending control signal TCTL which is outputted by the sending data input part 9 (see FIG. 5) of packet switching type LAN connecter 4, and these data are inputted into the sending data input part 9 of the packet switching type LAN connecter 4.

Next, in packet switching type LAN connecter 4, a frame/token bit series $F/TB_A$ is created based on the musical tone control data $D_T$, and this frame/token bit series $F/TB_A$ is synchronized with the output clock $CK_T$, which is a part of packet switching type LAN connecter 4, and outputted, and this series is then inputted into encoding part 13 of circuit switching type LAN connecter 15 (see FIG. 2). Details of the operation of packet switching type LAN connecter 4 are given in the specification and diagrams of Japanese Patent Application First Publication No. Hei 1-342291.

Then, this frame/token bit series $F/TB_A$ is encoded in encoding part 13 into a symbol series $S_{PT}$, based on the encoding method shown in FIG. 9, and this is then inputted into sending control part 27.

Next, symbol series $S_{PT}$ is divided and inserted into slots 5, 8, and 12 of each frame $F_S$ created in sending control part 27.

On the other hand, the 24-bit audio data $D_{AT}$ which is encoded in audio data processing part 22 is divided in sending control part 27, and the audio data which are to be transmitted to slave station $17_2$ are inserted into slot 1 of each frame $F_S$, the audio data which are to be transmitted to slave station $17_3$ are inserted into slot 6 of each frame $F_S$ and the audio data which are to be transmitted to slave station $17_4$ are inserted into slot 7 of each frame $F_S$.

Furthermore, as the slots $2 \sim 4$ and $9 \sim 11$ and $13 \sim 15$ of each frame $F_S$ are used in the other slave station $17_2 \sim 17_4$, no-data symbols (NC) are inserted thereinto.

Frames $F_S$ which have symbols inserted into each slot thereof in this manner are outputted from sending control part 27 and encoded into sending signals in encoding part 23 and then sent at regular intervals to slave stations $17_2 \sim 17_4$ through the medium of connecter 1 and transmission path 18.

Next, in decoding part 19 of slave station $17_2$, frames $F_S$ are decoded from the signal transmitted through the medium of transmission path 18 and connecter 1 and outputted and are then inputted into circuit switching type LAN connecter 15.

Then, in reception control part 24, among the slots $1 \sim 15$ of each frame $F_S$ which is inputted, symbols are retrieved from the slots which are allocated to the station and contain audio data, in this case slot 1, and a no-data symbol (NC) is inserted into this slot 1.

Furthermore, the retrieved symbols are successively stored in an internal memory of reception control part 24 and then are synchronized with the sample synchronization symbol (CS) and outputted as audio data $D_{AR}$.

In addition, in reception control part 24, the symbols relating to musical tone control data which were divided and inserted into slots 5, 8, and 12 of each frame $F_S$ are retrieved and no-data symbols (NC) are inserted in these slots 5, 8, and 12.

Furthermore, the retrieved symbols are combined and successively outputted as symbol series $S_{PR}$.

Next, symbol series $S_{PR}$ is decoded into frame/token bit series $F/TB_A$ in decoding part 3 and is then synchronized with clock $CK_R$ and outputted and inputted into packet switching type LAN connecter 4.

At this time, in the case in which no-data symbols (NC) are inserted in the slots 5, 8, and 12 of each frame, in other words, in the case in which no data relating to musical tone control data were sent by master station $17_1$, clock $CK_R$ cannot be outputted from decoding part 3. Accordingly, frame/token bit series $F/TB_A$ cannot be inputted into packet switching type LAN connecter 4.

Then, in the case in which a frame/token bit series $F/TB_A$ is inputted into packet switching type LAN connecter 4, the extraction of the frame bit series $FB_A$ which comprises the frame of the packet switching type LAN from the frame/token bit series $F/TB_A$ is conducted in received bit analyzing part 5 (see FIG. 5) of packet switching type LAN connecter 4. Next, in reception control part 6, receiving data $D_R$ are extracted from frame/token bit series $F/TB_A$ and these data are inputted into receiving data output part 7. These receiving data $D_R$ are outputted from receiving data output part 7 based on the receiving control signal RCTL outputted by musical tone control data processing part 21, and the data are then inputted into musical tone control data processing part 21 and processed.

Here, in the case of a timing in which a token is acquired and musical tone control data are sent in slave station $17_2$, musical tone control data $D_T$ are outputted by musical tone control data processing part 21 based on the sending control signal TCTL which is outputted from sending data input part 9 of packet switching type LAN connecter 4, and these data are then inputted into packet switching type LAN connecter 4.

Next, in packet switching type LAN connecter 4, a frame bit series $FB_A$ is created based on musical tone control data $D_T$ and then this series is synchronized with output clock $CK_T$ and outputted, and is then inputted into circuit switching type LAN connecter 15 (see FIG. 2).

Furthermore, in the case of a timing in which a token or a frame is simply repeated in slave station $17_2$, in packet switching type LAN connecter 4, the repeated frame/token bit series $F/TB_A$ is synchronized with an output clock $CK_T$ and outputted, and is then inputted into circuit switching type LAN connecter 15 (see FIG. 2).

Then, frame/token bit series $F/TB_A$ is encoded into symbol series $S_{PT}$ in encoding part 13 and this is then inputted into sending control part 27.

Next, symbol series $S_{PT}$ is divided in sending control part 27 and is inserted into slots 5, 8, and 12 of each frame $F_S$.

On the other hand, in the case of a timing in which frame/token bit series $F/TB_A$ is not outputted in slave station $17_2$, an output clock $CK_T$ cannot be outputted by packet switching type LAN connecter 4.

Accordingly, symbol series $S_{PT}$ cannot be outputted from encoding part 13, so that in sending control part 27, no-data symbols (NC) remain inserted in slots 5, 8, and 12 of each frame $F_S$.

Furthermore, in a case in which audio data $D_{AT}$ which are to be sent to each communication station $17_1$ and $17_3$ and $17_4$ exist in slave station $17_2$, these audio data $D_{AT}$ are outputted from audio data processing part 22 and are inputted into circuit switching type LAN connecter 15.

Next, in sending control part 27 of circuit switching type LAN connecter 15, among each slot of each frame $F_S$ outputted by reception control part 24, the audio data are divided, and the audio data $D_{AT}$ which are to be transmitted to slave station $17_2$ are inserted into slot 2, the audio data which are to be transmitted to slave station $17_4$ are inserted into slot 10, and the audio data which are to be transmitted to master station $17_1$ are inserted into slot 9.

On the other hand, in the case in which there is no audio data $D_{AT}$ which are to be sent to the communication stations $17_1$, $17_3$, and $17_4$ in slave station $17_2$, no-data symbols (NC) remain inserted in slots 2, 9, and 10 of each frame $F_S$.

Frames $F_S$, which have symbols inserted in each slot in this manner are outputted by the sending control part 27 and are encoded into sending signals in encoding part 23 and are then sent to communication stations $17_1$, $17_3$, and $17_4$ through the medium of connecter 1 and transmission path 18.

As the operation in communication station $17_2$ which is explained above is identical to that conducted in communication stations $17_3$ and $17_4$, an explanation of the operations thereof will be here omitted.

Then, when the frame $F_S$ which was encoded and sent from master station $17_1$ makes one circuit of transmission path 18 and is again inputted into master station $17_1$, the above described reception processing and sending processing is conducted in the master station $17_1$ as well, and the frame $F_S$ is again encoded and sent.

By means of the repetition of the above-described operation in each communication station $17_1 \sim 17_4$, the transmission of musical tone control data and audio data can be conducted on one transmission path 18.

In the case in which there is an abnormality in a certain slot of a frame $F_S$ which has been recovered in master station $17_1$, in master station $17_1$, a data error signal (ER), as shown in FIG. 9, is inserted into this slot and the frame is sent.

Furthermore, in the case in which a sending buffer which corresponds to a certain slot of a frame $F_S$ transmitted in each communication station $17_1 \sim 17_4$ has overflowed, in each communication station $17_1 \sim 17_4$, an overflow signal (OV) shown in FIG. 9 is inserted into this slot and frame $F_S$ is sent.

Next, an explanation will be given of the fault repair operations in the case in which a transmission fault such as the disconnection of the transmission path 18 connecting the communication stations $17_3$ and $17_4$ of FIG. 1 occurs for some reason, at the time of the above-described transmission.

The present inventors have previously jointly disclosed a communication managing method which makes it possible for each communication station to grasp the address of the neighboring transmission on the upstream side (hereinafter termed the "upstream neighboring station address") in order to manage each communication station in the ring-type packet switching type LANs (see the specification and diagrams of Japanese Patent Application First Publication No. Hei 1-342293).

Here, this communication station management method will be explained.

First, the master station (hereinafter termed the "active monitor") transmits at regular intervals a special frame (hereinafter referred to as the "AMP frame") to which is attached the address of the station and which indicates that the station is operating normally.

On the other hand, each communication station which is downstream (hereinafter referred to as "standby monitors") incorporate the address which is in the received AMP frame into their own stations and transmits an AMP frame in which this address has been replaced with the address of the station to the next station.

Then, the active monitor restores the AMP frame which has made one circuit of the ring and incorporates the address which is within the AMP frame into itself.

By means of the method stated above, it is possible for each communication station to grasp the address of the station which is normally the upstream neighbor thereof.

In a case in which the AMP frame described above cannot be received in a certain standby monitor within a fixed period of time, this standby monitor determines that the active monitor is not operating correctly.

In this case, the standby monitor which has detected an abnormality in the active monitor compulsorily sends the special frame (hereinbelow referred to as the "claim token frame") which is issued in the case in which the active monitor cannot be detected.

By means of this, the active monitor which receives the claim token frame stops being the active monitor. In addition, when all communication stations including the active monitor receive the claim token frame, they participate in a competition for the selection for a new active monitor.

Next, the new active monitor which was selected by means of the above-described competition repairs the ring by means of processing which purges the ring. In this purging processing, an abnormal token or frame which has been transmitted on the ring for more than 1 cycle is detected and eliminated by the active monitor and a new token is created and sent. Then, the ring is initialized by means of the synchronization of the other communication stations with this. The above-described processing in the standby monitors is termed claim token processing.

Furthermore, in the case in which abnormalities have been detected in the active monitor, for example, in a case in which an abnormal token or frame such as those described above has been detected or in a case in which a normal token or frame was not detected within a fixed period, the above-described purging processing is conducted and the ring is repaired.

However, in a case in which the ring is not repaired by purging processing, transfer is made to claim token processing.

In addition, in a case in which the ring is not repaired by means of claim token processing, transfer is made to beacon processing. In this beacon processing, first the communication station which detected an abnormality creates and sends a frame which is for the purpose of communicating the location and cause of the abnormality (hereinafter termed the "beacon frame"). In addition, a communication station which has received a normal beacon frame is removed from beacon processing and only those communication stations remain which have detected abnormalities between themselves and their upstream neighboring stations. By means of this, control can be exercised which removes the communication stations which have identified locations with abnormalities or which have abnormalities from the ring. Then, the ring is repaired by means of the removal from the ring of abnormal communication stations, either automatically or as directed by a user of the communication stations.

Normally, the abnormality detection period of the active monitor is shorter than the abnormality detection period of the standby monitors, so that the active monitor detects abnormalities first.

The above-described repair concept for transmission faults is used in LANs which are able to transmit stream data and commands on one transmission path as well.

Normally, in the case in which transmission is conducted normally, the slave stations repeat the frames $F_S$ which are transmitted by the master station or by the upstream neighbor station and merely conduct receiving processing or sending processing at this time. Furthermore, the clock $CK_T$ which is outputted by packet switching type LAN connector 4 of a slave station is a bit clock $CK_R$ which is extracted by means of the PLL circuit part within decoding part 3 of circuit switching type LAN connector 15.

However, in the sending control part 27 of the slave stations which detect abnormalities by means of the above method, the frame $F_S$ which was transmitted was not repeated; rather, an independent frame is created and this frame is synchronized with a clock which functions by means of quartz oscillation in the interior of packet switching type LAN connector 4 and is then compulsorily transmitted. At this time, in this frame, only the symbols consisting of the encoded frame/token bit series $F/TB_A$ outputted from packet switching type LAN connector 4 are inserted into the corresponding slots. After this, faults are repaired by means of the above-described fault repair function possessed by packet switching type LAN connector 4 and the network is reestablished.

As explained above, by means of utilizing the fault repair function of the packet switching type LAN, frames can be transmitted even if there are faults in the LANs, so that there is no need to consider the possibility of a stoppage in transmission. Furthermore, it is possible to use circuit switching type LAN connectors 15 which do not have fault repair functions.

The maintenance of the LANs is conducted using the frames $FB_A$ which are inputted into and outputted from the packet switching type LAN connector 4.

Furthermore, in the explanation given above, an example was given in which the slots of the frames which were inputted into and outputted by the circuit switching type LAN connector 15 were sent in advance; however, as a modification thereof, it is also possible to use frames $FB_A$ which are inputted into and outputted from the packet switching type LAN connector 4. By proceeding in this manner, it is possible to take appropriate countermeasures to the changing transmission needs in each communication station $17_1 \sim 17_4$.

(2) Explanation of the Second Concept

A self-synchronizing signal in which a clock is added to data is used as the signal which is transmitted along the transmission path and a encoding method for the (0/1 level) command and the stream data is used for the purpose of combining the commands and stream data, in which method one symbol is expressed by 3 bits. In this case, if the data which are used for framing are included and encoded, the efficiency of the transmission declines. For example, in order to express the 3 states of data (0), data (1), and data for framing, 2 bits are necessary, so that the efficiency of transmission falls to ½; however, as the types of framing data are not numerous, if 4-bit data is expressed in terms of 5 bits, the decline in the efficiency of transmission can be held at 4/5.

FIG. 12 shows an example of the above-described encoding method. In this diagram, the "+" symbols indicate reversals in polarity, while "−" symbols indicate that polarities are not reversed. Furthermore, (ND) is a symbol which shows that there are no data, as in the case of the above-described first concept (this is hereinafter referred to as the "no-data symbol"). Next, the data are transformed into bit frames by means of the format shown in FIG. 13 and sent. The lengths of the bit frames are not standardized; a bit frame begins with a bit series start synchronization symbol (BS) and comprises a bit series composed of (P0), (P1), (S0), (S1), and (ND). A preamble (PRA) is placed between bit frames, and by means of the detection of this preamble (PRA), the end of a bit series is detected.

Furthermore, bit series start synchronization symbols (BS) are inserted at regular intervals so as to enable bit synchronization.

As these symbols are in bit units, if the order of the symbols agrees with the order of the original data, then positioning within the bit frames does not become a problem.

The following two processing methods are possible in the creation and recovery of bit frames.

In the first processing method, the creation and recovery of bit frames is conducted in the interval between neighboring stations and the repetition of these bit frames is not conducted. In the case of this processing method, each communication station recovers the bit frame which is transmitted from the neighboring upstream station, creates a new bit frame and transmits this bit frame to the neighboring downstream station using the clock which oscillates in the station. In the case in which there are no data, no-data symbols (ND) are written in place of the data symbols.

In the second processing method, as in the first concept described above, a master station conducts the creation and recovery of the bit frames and slave stations repeat these bit frames and conduct receiving and sending processing.

Furthermore, any type of circuit switching type LAN protocols may be used, however, in the following explanation, the protocols which are used in the first concept described above are used.

Hereinafter, an example of the second concept will be explained with reference to the diagrams. Here, the stream data generally represent audio data, while the commands generally represent musical tone control data.

(I) Explanation of an Example Using a First Processing Method

The structure of the ring-type LAN is identical to that of the structure shown in FIG. 1. However, there is no difference between the master stations and the slave stations; each communication station creates bit frames and sends them.

Figure 3:
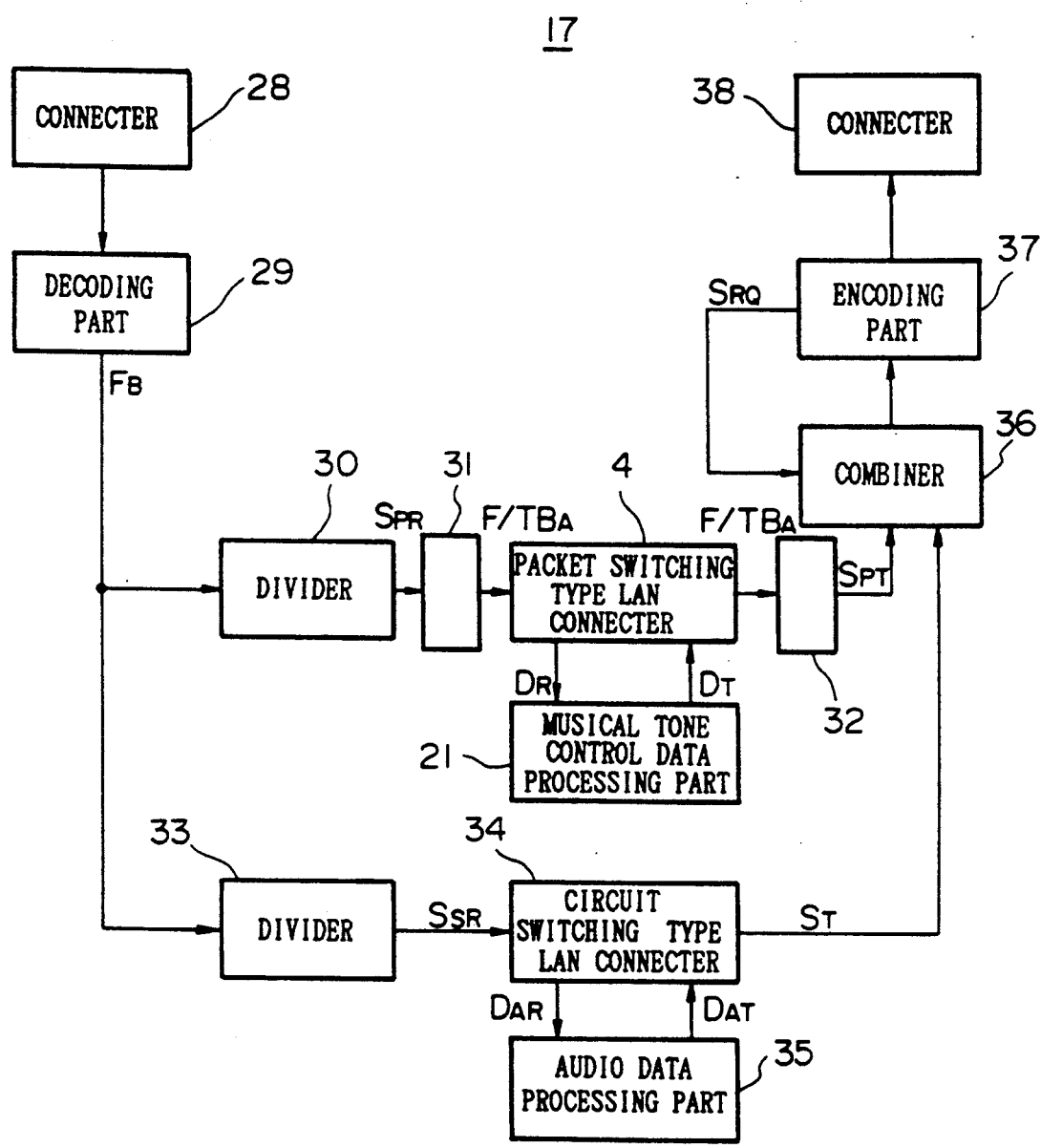
FIG. 3 is a block diagram showing the structure of a communication station 17 in accordance with a preferred embodiment using a first processing procedure of the second concept.

Next, FIG. 3 is a block diagram showing the structure of a communication station 17. In the diagram, those parts which correspond to the parts shown in FIG. 2 are identically numbered, and an explanation thereof is here omitted. In FIG. 3, reference number 28 indicates a connecter which connects the station to the transmission path 18 which is disposed between the station and the neighboring upstream station, and reference number 29 indicates a decoding part which decodes a bit series from the signal which is transmitted through the medium of transmission path 18 and connecter 28 and detects bit series start synchronization symbols (BS), synchronizes bit frame $F_B$ witj the bit series start synchronization symbols (BS), and outputs this.

Furthermore, reference number 30 indicates a divider, into which bit frame $F_B$ is inputted and which extracts only those symbols which are used in the packet switching type LAN, creates a new symbol series $S_{PR}$ and outputs this series. Reference number 31 indicates a decoding part which decodes the inputted symbol series $S_{PR}$ into a packet switching type LAN frame/token bit series $F/TB_A$ and outputs this to packet switching type LAN connecter 4. Reference number 32 indicates an encoding part into which the frame/token bit series $F/TB_A$ which is outputted from packet switching type LAN connecter 4 inputted and which encodes this into symbol series $S_{PT}$ and outputs this series.

Furthermore, reference number 33 indicates a divider, into which bit frame $F_B$ is inputted and which extracts only the symbols which are used in the circuit switching type LAN, creates a new symbol series $S_{SR}$ and outputs this series. Reference number 34 indicates a circuit switching type LAN connecter, into which symbol series $S_{SR}$ is inputted and which conducts the processing and replacement of symbol series $S_{SR}$ by means of predetermined processing methods and outputs a new symbol series $S_{ST}$. Reference number 35 indicates an audio data processing part, which conducts the processing of the audio data $D_{AR}$ outputted by circuit switching type LAN connecter 34 and which also conducts the processing of the audio data $D_{AT}$ which are to be sent to another communication station 17.

In addition, reference number 36 indicates a combiner and reference number 37 indicates an encoding part; symbol series $S_{PT}$ and $S_{ST}$ are inputted into combiner 36 and these series are temporarily stored in an internal memory by bit unit. In addition, when the symbol requirement signal $S_{RQ}$ which is outputted by the encoding part 37 is inputted, symbol series $S_{PT}$ and $S_{ST}$ are retrieved from memory and outputted. At this time, in the case in which symbol series $S_{PT}$ and $S_{ST}$ do not exist in memory, no-data symbols (ND) are outputted. The symbol series $S_{PT}$ and $S_{ST}$ which are outputted by combiner 36 are inputted into encoding part 37 and here a bit frame $F_B$ which has inserted therein at regular intervals bit series start synchronization symbols (BS) is created, this bit frame $F_B$ is encoded into a sending signal and sent through the medium of connecter 38 and transmission path 18.

The operation by which the communication stations $17_1 \sim 17_4$ having this type of structure transmit audio data and musical tone control data will be here explained.

In communication station $17_1$, musical tone control data $D_T$ such as key-on signals and the like from a musical tone control data processing part 21 (see FIG. 3) are outputted based on the output timing of the sending control signal TCTL which is outputted from sending data input part 9 (see FIG. 5) of the packet switching type LAN connecter 4, and this is inputted into the sending data input part 9 of packet switching type LAN connecter 4.

Next, in packet switching type LAN connecter 4, a frame/token bit series $F/TB_A$ is created based on the musical tone control data $D_T$ and then this frame/token bit series $F/TB_A$ is synchronized with an output clock $CK_T$ which is possessed by packet switching type LAN connecter 4, and this is then outputted and is inputted into encoding part 32.

Then, the frame/token bit series $F/TB_A$ is encoded in encoding part 32 into a symbol series $S_{PT}$, based on the encoding method shown in FIG. 12, and then this is inputted into combiner 36 and temporarily stored in an internal memory by bit unit.

On the other hand, the 24-bit audio data $D_{DT}$ are outputted from audio data processing part 35 and inputted into circuit switching type LAN connecter 34, and this is then encoded into a symbol series $S_{ST}$ based on the encoding method shown in FIG. 12, and then this is inputted into combiner 36 and temporarily stored in an internal memory by bit unit period.

Next, in combiner 36, when the symbol requirement series $S_{RQ}$ which is outputted by encoding part 37 is inputted, the symbol series $S_{PT}$ and $S_{ST}$ are retrieved from memory and outputted. At this time, in the case in which no symbol series $S_{PT}$ and $S_{ST}$ exist in memory, no data symbols (ND) are outputted, as explained above.

In addition, in encoding part 37, a bit frame $F_B$ is created, which has inserted therein, at regular intervals, bit series start synchronization symbols (BS) which are synchronized with a clock which oscillates in the interior thereof, based on symbol series $S_{PT}$ and $S_{ST}$, this bit frame $F_B$ is encoded into a sending signal and sent through the medium of connecter 38 and transmission path 18.

Next, in decoding part 29 of communication station $17_2$, a symbol series is decoded from the signal which was transmitted through the medium of transmission path 18 and connecter 28. In addition, bit series start synchronization symbols (BS) are detected in this symbol series; this is synchronized with bit series start synchronization symbol (BS) and outputted as bit frame $F_B$ and is then inputted into dividers 30 and 33.

Then, in divider 30, only those symbols which are used by the packet switching type LAN are extracted from the bit frame $F_B$, and a new symbol series $S_{PR}$ is created. This symbol series $S_{PR}$ is decoded into a packet switching type LAN frame/token bit series $F/FB_A$ in decoding part 31 and outputted and is then inputted into packet switching type LAN connecter 4.

Next, in receiving bit analyzing part 5 of the packet switching type LAN connecter 4, the extraction from the frame/token bit series $F/TB_A$ of a frame bit series $FB_A$, which comprises the frame of the packet switching type LAN, is conducted.

Next, in receiving control part 6, receiving data $D_R$ are extracted from frame/token bit series $F/TB_A$ and these data are then inputted into receiving data output part 7. These receiving data $D_R$ are outputted from receiving data output part 7 based on the receiving control signal RCTL, which is outputted from musical tone control data processing part 21, and are then inputted into musical tone control data processing part 21 and are processed.

Here, in the case of the timing at which a token is obtained and musical tone control data are sent in sending station $17_2$, musical tone control data $D_T$ are outputted from musical tone control data processing part 21 based on sending control signal TCTL, which is outputted from the sending data input part 9 of packet switching type LAN connecter 4, and these data are then inputted into packet switching type LAN connecter 4.

Next, in packet switching type LAN connecter 4, a frame bit series $FB_A$ is created based on musical tone control data $D_T$, this series is then synchronized with output clock $CK_T$ and outputted, and is then inputted into encoding part 32.

Next, the frame/token bit series $F/TB_A$ is encoded into symbol series $S_{PT}$ in encoding part 32 and is then inputted into combiner 36 and is then temporarily stored in an internal memory by bit unit.

Furthermore, in the case of a timing at which frame/token bit series $F/TB_A$ is not outputted in communication station $17_2$, the output clock $CK_T$ cannot be outputted from packet switching type LAN connecter 4, so that the symbol series $S_{PT}$ cannot be outputted from encoding part 32.

On the other hand, in divider 33, only those symbols which are used in the circuit switching type LAN are extracted from bit frame $F_B$ and a new symbol series $S_{SR}$ is created, and this symbol series $S_{SR}$ is then inputted into circuit switching type LAN connecter 34. Then, in circuit switching type LAN connecter 34, the audio data $D_{AR}$ which are directed to the station are extracted from the symbol series $S_{SR}$ by a predetermined processing method, and these data are then outputted to audio data processing part 35. Furthermore, in the case in which audio data $D_{AT}$ exist in audio data processing part 35 which are to be sent to each communication station $17_1$, $17_3$, and $17_4$, these audio data $D_{AT}$ are outputted from audio data processing part 35, are inputted into circuit switching type LAN connecter 34, and based on these audio data $D_{AT}$ a new symbol series $S_{ST}$ is created, and this series is then inputted into combiner 36 and is temporarily stored in an internal memory by bit unit.

Furthermore, in a case in which no audio data $D_{AT}$ which are to be sent to each communication station $17_1$, $17_3$, and $17_4$ exist in communication station $17_2$, the symbol series $S_{ST}$ cannot be outputted from circuit switching type LAN connecter 34.

Next, in combiner 36, when the symbol requirement signal $S_{RQ}$ which is outputted from encoding part 37 is inputted, the symbol series $S_{PT}$ and $S_{ST}$ are retrieved from memory and outputted. At this time, in the case in which no symbol series $S_{PT}$ and $S_{ST}$ exist in the memory, a no-data symbol (ND) is outputted.

Next, in encoding part 37, a bit frame $F_B$ is created which has inserted thereinto at regular intervals a bit series start synchronization symbol (BS) which has been synchronized with the clock which oscillates in the internal part, based on symbol series $S_{PT}$ and $S_{ST}$, and this bit frame $F_B$ is encoded into a sending signal and is sent through the medium of connecter 38 and transmission path 18.

As the operation of the communication stations $17_3$ and $17_4$ is identical to the operation of the communication station $17_2$ which is described above, an explanation of this will be omitted here.

By means of the repeated conducting of the above-described operation in each communication station $17_1 \sim 17_4$ the transmission of musical tone control data and audio data can be conducted using one transmission path 18.

In the above example, the communication stations $17_1 \sim 17_4$ create the bit frames $F_B$ based on independent clocks, so that, for example, in the case in which the frequency of the clock of communication station $17_1$ is the highest and the frequency of the clock of communication station $17_4$ is the lowest, there are cases in which the data become blocked at the input part of communication station $17_1$. However, in such a case, by providing data buffers in each communication station $17_1 \sim 17_4$ it is possible to adjust the length of each bit frame $F_S$.

(II) Explanation of an Example of the Second Processing Method

First, the ring-type LAN has a structure which is identical to that shown in FIG. 1. Accordingly, communication station $17_1$ is a master station which sends frames at regular intervals and restores these frames, and communication stations $17_2 \sim 17_4$ are slave stations which conduct sending processing and receiving processing while repeating the frames. Furthermore, the structure of master station $17_1$ is identical to that structure shown in FIG. 3.

Figure 4:
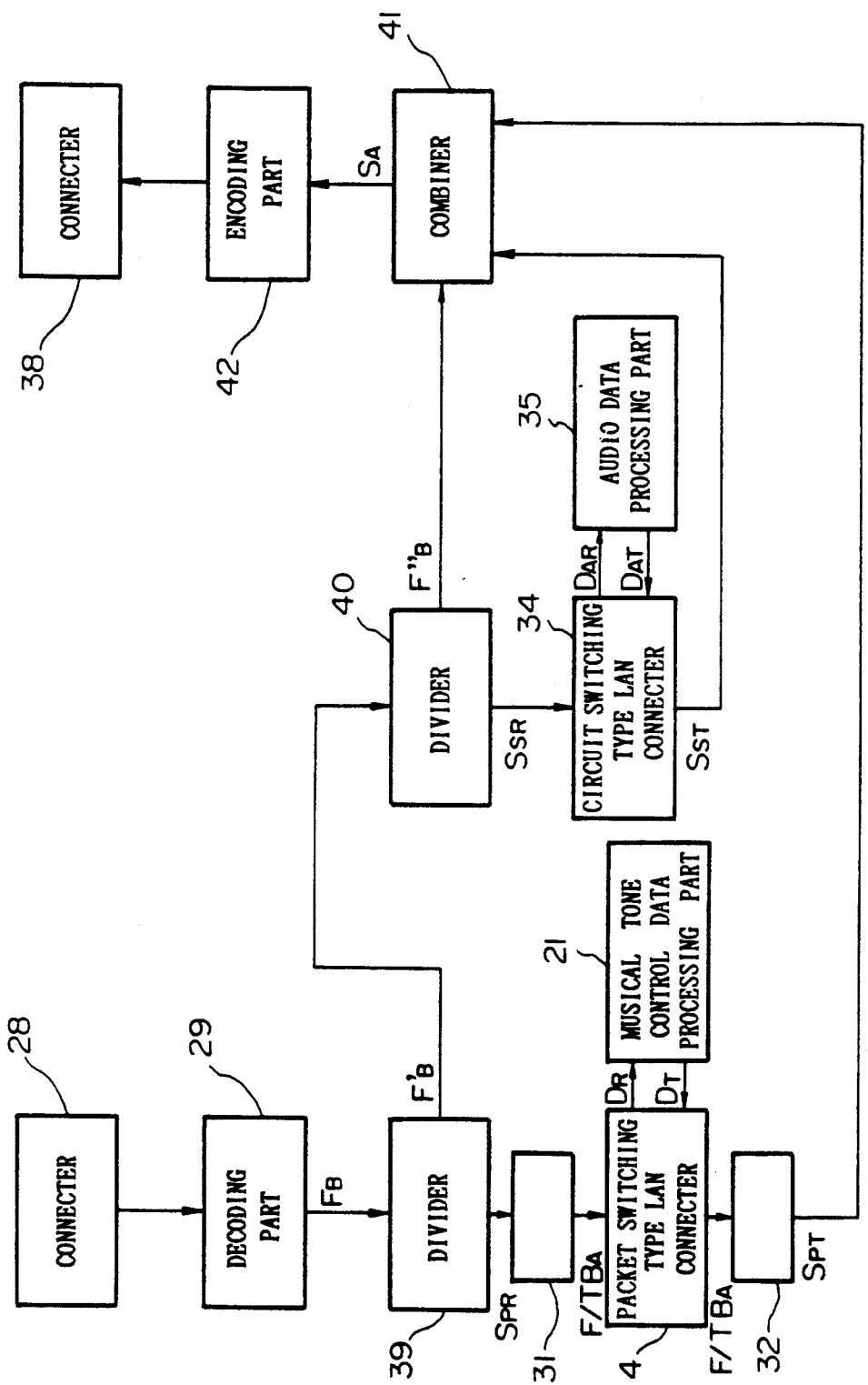
FIG. 4 is a block diagram showing the structure of a slave station 17 using a second processing procedure of the second concept.

Next, FIG. 4 is a block diagram showing the structure of the slave stations $17_2 \sim 17_4$. In the diagram, parts which correspond to the parts of FIG. 3 are identically numbered, and an explanation of these parts is here omitted. In FIG. 4, reference numeral 39 indicates a divider, into which bit frame $F_B$ is inputted and which extracts only those symbols which are used in the packet switching type LAN, creates a symbol series $S_{PR}$ and outputs this series, and also inserts no-data symbols (ND) in place of the extracted symbols and outputs a new bit frame $F'_B$.

Furthermore, reference numeral 40 indicates a divider, into which bit frame $F'_B$ is inputted and which extracts only those symbols which are used in the circuit switching type LAN, creates a symbol series $S_{SR}$ and inserts no-data symbols (ND) in place of the extracted symbols and outputs a new bit frame $F''_B$.

Furthermore, reference numeral 41 indicates a combiner into which symbol series $S_{PT}$ and $S_{ST}$ are inputted; these series are temporarily stored in an internal memory by bit unit. Then, the bit frame $F''_B$ which is outputted by divider 40 is inputted and when no-data symbols (ND) are detected in this bit frame $F''_B$, these no-data symbols (ND) are replaced by the symbol series $S_{PT}$ and $S_{ST}$ which are retrieved from memory and a new bit series $S_A$ is outputted. At this time, in the case in which symbol series $S_{PT}$ and $S_{ST}$ do not exist in memory, the bit frame $F''_B$ is outputted in an unaltered form as bit series $S_A$.

In addition, reference numeral 42 indicates an encoding part into which the bit series $S_A$ which is outputted from combiner 41 is inputted and which encodes this bit series $S_A$ into a sending signal and sends it through the medium of connecter 38 and transmission path 18.

The operation by which the communication stations $17_1 \sim 17_4$ having this type of structure transmit the audio data and musical tone control data will be explained hereinafter.

First, in the master station 17l of FIG. 3, musical tone control data $D_T$ such as key-on signals or the like are outputted from musical tone control data processing part 21 based on the output timing of the sending control signal TCTL which is outputted from sending data input part 9 (see FIG. 5) of the packet switching type LAN connector 4, and these data are then inputted into the sending data input part 9 of packet switching type LAN connector 4.

Next, in packet switching type LAN connector 4, the frame/token bit series $F/TB_A$ is created based on the musical tone control data $D_T$, and then this frame/token bit series $F/TB_A$ is synchronized with an output clock $CK_T$ which is possessed by packet switching type LAN connector 4, and this series is then inputted into encoding part 32.

Then, the frame/token bit series $F/TB_A$ is encoded into a symbol series $S_{PT}$ in encoding part 32 based on the encoding method shown in FIG. 12, and this series is then inputted into combiner 36 and is temporarily stored in an internal memory by bit unit.

On the other hand, the 24-bit audio data $D_{AT}$ are outputted from audio data processing part 35 and are inputted into circuit switching type LAN connector 34, and are then encoded into a symbol series $S_{ST}$ based on the encoding method shown in FIG. 12, and after this, this series is inputted into combiner 36 and is temporarily stored in an internal memory by bit unit.

Next, in combiner 36, when the symbol requirement signal $S_{RQ}$ which is outputted by encoding part 37 is inputted, the symbol series $S_{PT}$ and $S_{ST}$ are retrieved from memory and outputted. At this time, in the case in which symbol series $S_{PT}$ and $S_{ST}$ do not exist in memory, no-data symbols (ND) are outputted.

Then, in encoding part 37, a bit frame $F_B$ is created which has inserted thereinto at regular intervals a bit series start synchronization symbol (BS) which is synchronized with an internal oscillating clock, based on the symbol series $S_{PT}$ and $S_{ST}$, and this bit frame $F_B$ is encoded into a sending signal and is sent through the medium of connector 38 and transmission path 18.

Next, in the decoding part 29 of the slave station $17_2$ of FIG. 4, a symbol series is decoded from the signal which was transmitted through the medium of transmission path 18 and connector 28 and a bit series start synchronization symbol (BS) is detected from this symbol series, and this series is then synchronized with the bit series start synchronization symbol (BS) and is outputted as bit frame $F_B$ and is then inputted into divider 39.

Next, in divider 39, only those symbols which are used in the packet switching type LAN are extracted from the bit frame $F_B$, and a new symbol series $S_{PR}$ is created and outputted and no-data symbols (ND) are inserted in place of the extracted symbols, and a new bit frame $F'_B$ is outputted.

Next, the operation from the inputting of the symbol series $S_{PR}$ into decoding part 31 up to the input of the symbol series $S_{PT}$, which is outputted from encoding part 32 into combiner 41 and temporarily stored in the internal memory thereof, is the same as the operation in the above-described first processing method from the input of the symbol series $S_{PR}$ into decoding part 31 up to the input of the symbol series $S_{PT}$, which is outputted from encoding part 32 into combiner 36 and temporarily stored in the internal memory thereof, so that an explanation of this operation will be omitted here.

In divider 40, only those symbols used in the circuit switching type LAN are extracted from the bit frame $F'_B$ and a new symbol series $S_{SR}$ is created and outputted, and no-data symbols (ND) are inserted in place of the extracted symbols and a new bit frame $F''_B$ is outputted.

Next, the operation from the input of symbol series $S_{SR}$ into circuit switching type LAN connector 34 up to input of symbol series $S_{ST}$ into combiner 41 and the temporary storage in the internal memory thereof is identical to the operation in the above-described first processing method from the input of the symbol series $S_{SR}$ into the circuit switching type LAN connector 34 up to the input of the symbol series $S_{ST}$ into the combiner 36 and the temporary storage thereof in an internal memory, so that an explanation of this operation will be here omitted.

Next, in combiner 41, the bit frame $F''_B$ which was outputted from divider 40 is inputted and when no-data symbols (ND) are detected from this bit frame $F''_B$, the symbol series $S_{PT}$ and $S_{ST}$ are retrieved from memory and these symbol series $S_{PT}$ and $S_{ST}$ are then put in place of the no-data symbols (ND). By means of this, a symbol series $S_A$ is outputted from combiner 41. At this time, in the case in which symbol series $S_{PT}$ and $S_{ST}$ do not exist in memory, the bit frame $F''_B$ is outputted in an unchanged form as symbol series $S_A$.

Next, in encoding part 42, when symbol series $S_A$ is inputted, this symbol series $S_A$ is encoded into a sending signal and is sent through the medium of connector 38 and transmission path 18. The operation in each communication station $17_3$ and $17_4$ is conducted in an identical manner to that of the transmission station $17_2$ described above, so that an explanation of this operation is omitted here.

Next, when a bit frame $F_B$ which is encoded and sent by the master station $17_1$ makes one cycle of the transmission path 18 and is again inputted into master station $17_1$, the above-described receiving and sending processing is also conducted in the master station $17_1$ and the bit frame $F_B$ is encoded and sent.

By means of the repeated conducting of the above-described operation, in each communication station $17_1 \sim 17_4$, the transmission of the musical tone control data and audio data can be carried out using one transmission path 18.

The fault repair operation of the LAN described in the above first concept can also be applied to a ring LAN which is in accordance with the second concept.

Furthermore, in the examples of the LANs which were in accordance with the above-described first and second processing methods, an example was given which used the structure shown in FIG. 5 as the packet switching type LAN connector 4, however, this is not necessarily so limited. In other words, any type of connecter may be used, so long as it is usable in ring-type packet switching type LANs.

In addition, in the examples of LANs in accordance with the first and second processing methods given above, examples were shown in which only one packet switching type LAN connecter 4 and circuit switching type LAN connecter 34 were provided in each communication station 17, however, this is not necessarily so limited and a number of further LAN connecters may be connected.

Furthermore, in the examples of the LAN in accordance with the first processing method given above, an example was given in which the bit frame $F_B$ did not have a fixed length and the end of the bit frame $F_B$ was detected by means of the detection of a preamble (PRA), however, it is also permissible to fix the length of the bit frame $F_B$ and insert bit series start synchronization symbols (BS) and then by means of the detection of a predetermined number of bits, to detect the end of the bit frame $F_B$. Furthermore, even if the length of the bit frame $F_B$ is not fixed, it is also permissible to detect the end of the bit frame $F_B$ by encoding a symbol which indicates the end of the bit frame $F_B$ and detecting this symbol.

Furthermore, in all examples given above, because the previously disclosed packet switching type LAN connecters were used, an example was given in which the commands and the stream data were transmitted by means of differing LAN connecters, however, this is not necessarily so limited. In other words, it is acceptable to transmit both commands and stream data by means of one LAN, so that it is permissible to transmit commands and stream data by means of 1 LAN connecter.

What is claimed is:

1. A ring-type local area network (LAN) which conducts data transmission along a plurality of communication stations which are connected in a ring form by means of a transmission path,
in which said plurality of communication stations are provided with:
decoding means for decoding a symbol series from signals transmitted through said transmission path, detecting a synchronization symbol synchronizing said symbol series, synchronizing said decoded symbol series with said synchronization symbol, and outputting said decoded and synchronized symbol series as a first symbol series;
a plurality of dividing means for inputting said first symbol series thereinto, extracting only specific symbols from said first symbol series which are used in a plurality of LANs which process said data by means of different protocols, creating a second symbol series based on said specific symbols, and outputting said second symbol series;
a plurality of LAN connecting means, into which said second symbol series are inputted, for processing and replacing said second symbol series by means of previously determined protocols and outputting a new symbol series;
combining means, into which said new symbol series outputted from each of said plurality of LAN connecting means are inputted, for combining said new symbol series and outputting a combined symbol series; and
encoding means for encoding a synchronization symbol into said combined symbol series outputted from said combining means at regular intervals, or in the case in which there is no symbol series, for providing a symbol indicating that there are no symbols to thereby create a new symbol series, and for encoding said new symbol series into a transmission signal and outputting said encoded symbol series.

2. A ring-type local area network (LAN) according to claim 1, wherein each of said plurality of LAN connecting means comprises:
packet switching type LAN connecting means for sending packet data to another communication station through said transmission path and receiving packet data sent through said transmission path; and
circuit switching type LAN connecting means for encoding stream data and said packet data outputted from said packet switching type LAN connecting means into a symbol series and sending the symbol series to another communication station through said transmission path, and for receiving a symbol series sent through said transmission path, encoding the symbol series into stream data and packet data, and outputting the packet data to said packet switching type LAN connecting means.

3. A ring-type local area network (LAN) according to claim 2, in which, in the case in which packet data are not outputted from said packet switching type LAN connecting means, said circuit switching type LAN connecting means sends a no-data symbol indicating the nonexistence of packet data to another communication station through said transmission path, and in the case in which a no-data symbol sent through said transmission path is received, said circuit switching type LAN connecting means outputs nothing to said packet switching type LAN connecting means.

4. A ring-type local area network (LAN) which connects data transmission among a plurality of communication stations connected in a ring form by means of a transmission path,
in which, among said plurality of communication stations, a fixed sole communication station is provided with:
decoding means for decoding a symbol series from a signal transmitted through said transmission path, detecting a synchronization symbol synchronizing said symbol series, synchronizing said decoded symbol series with said synchronization symbol and outputting a first symbol series;
a plurality of first dividing means, into which said first symbol series in inputted, for extracting only symbols from said first symbol series which are used in a plurality of LANs which process data by means of differing protocols, creating a second symbol series, and outputting said second symbol series;
a plurality of LAN connecting means, into which said second symbol series are inputted, for processing and replacing said second symbol series by means of protocols which are determined in advance, and outputting new symbol series;
first combining means, into which a plurality of the new symbol series outputted by said plurality of LAN connecting means are inputted, for combining said inputted symbol series and outputting a new symbol series; and
encoding means for inserting a synchronization symbol at regular intervals into said new symbol series outputted from said first combining means, and furthermore, in the case in which there is no symbol series, inserting a no-data symbol indicating the nonexistence of symbols and creating a new symbol series, encoding said symbol series into a transmission signal, and outputting said transmission signal; and
each downstream communication station is provided with:
second decoding means for decoding a symbol series from a signal transmitted through said transmission path, detecting a synchronization symbol synchronizing said symbol series, synchronizing said decoded symbol series with said synchronization symbol and outputting a first symbol series;
a plurality of second dividing means for extracting only symbols from said first symbol series which are used in a plurality of LANs which process data by means of differing protocols, creating and outputting a second symbol series, and inserting no-data symbols in place of said extracted symbols and outputting a new symbol series;
a second plurality of LAN connecting means, into which said new symbol series are inputted, for processing and replacing said new symbol series by means of protocols which are determined in advance, and outputting a new symbol series;
second combining means, into which a plurality of the new symbol series outputted by said plurality of LAN connecting means are inputted, and into which a symbol series which is outputted from second combining means within a final step is inputted, for detecting a no-data symbol in the symbol series, replacing said no-data symbol with said plurality of symbol series, and outputting a new symbol series, and in the case in which a plurality of symbol series are not inputted, outputting said symbol series outputted from said second combining means within the final step as said new symbol series; and encoding means for encoding said symbol series outputted by said second combining means into a transmission signal and outputting this signal.

* * * * *